Sept. 12, 1961 P. A. WARD 2,999,656
GAS TURBINE ENGINE WITH CANTED VARIABLE GAP AUGMENTARY INTAKE
Filed May 18, 1959 2 Sheets-Sheet 1

Peter Arthur Ward
Inventor

By Leech & Radus
Attorneys

Sept. 12, 1961  P. A. WARD  2,999,656
GAS TURBINE ENGINE WITH CANTED VARIABLE GAP AUGMENTARY INTAKE
Filed May 18, 1959  2 Sheets-Sheet 2
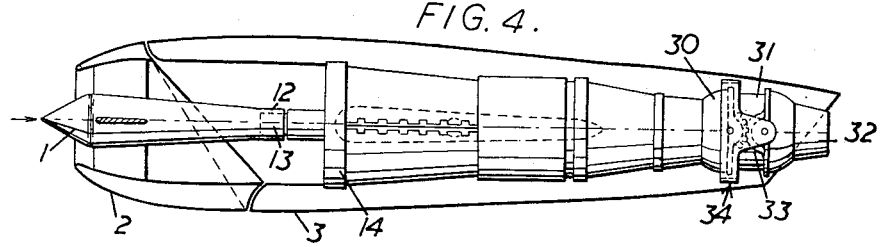
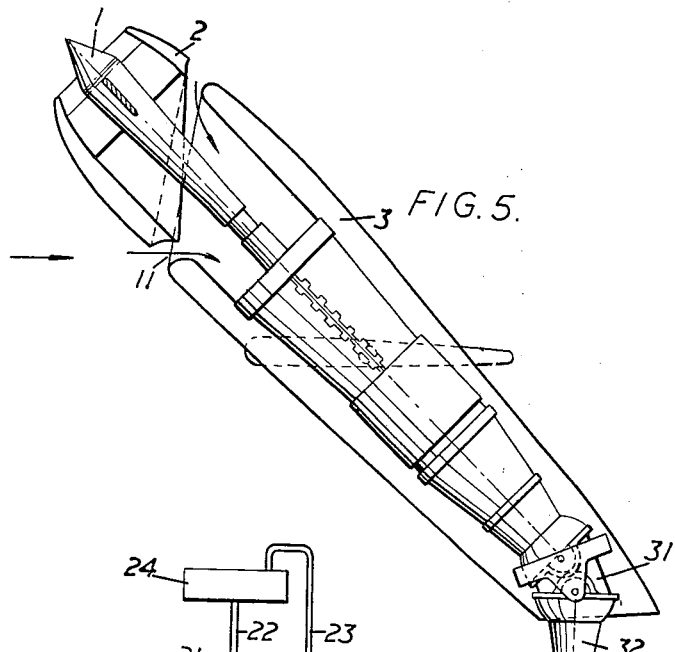
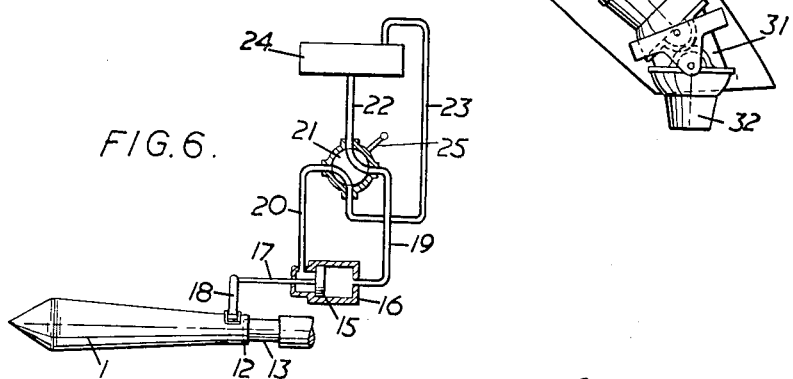
Peter Arthur Ward
Inventor
By Leech & Radue
Attorneys

United States Patent Office 2,999,656
Patented Sept. 12, 1961

2,999,656
GAS TURBINE ENGINE WITH CANTED VARIABLE GAP AUGMENTARY INTAKE
Peter Arthur Ward, Littleover, Derby, England, assignor to Rolls-Royce Limited, Derby, England, a company of Great Britain
Filed May 18, 1959, Ser. No. 813,903
Claims priority, application Great Britain Aug. 15, 1958
7 Claims. (Cl. 244—23)

The invention relates to a gas turbine engine and particularly to a gas turbine engine which is used to provide thrust for vertical take-off.

According to the present invention there is provided a gas turbine engine adapted to produce vertical thrust and having air intake means for the compressor of the engine, said air intake means comprising internal wall members which are disposed downstream of the nose of the engine and which are spaced apart, or are adapted to be spaced apart, to provide between them an annular grap, the internal wall members being shaped to direct air through said annular gap and into the air intake means.

The invention is of particular, but not exclusive, utility where the engine is of the tiltable kind which can be used both for providing thrust for forward propulsion and for providing vertical thrust.

Preferably the internal wall members are relatively movable so that they may be moved to close and open the said annular gap, means being provided for effecting such relative movement.

Thus the internal wall members may be respectively provided on a nose portion of the engine and on the remaining portion thereof, the nose portion being axially movable towards and away from the remaining portion. If desired, the internal wall members may be respectively provided on a nose portion and on the remaining portion of a nacelle surrounding the engine proper, whereby the annular gap is formed in said nacelle.

The means for producing relative movement of the internal wall members may comprise a piston and cylinder arrangement, the movement being purely axial.

Alternatively, means may be provided for closing and opening the annular gap, said means comprising a sliding cylindrical valve member coaxial with the longitudinal axis of the engine.

If desired the engine can incorporate a variable jet nozzle, which can be of the kind disclosed in my co-pending application Serial No. 810,629, filed May 4, 1959, the arrangement being such that the engine can be moved through 45° whilst the nozzle rotates from horizontal to vertical. Thus with the engine at 45° the nozzle will provide vertical thrust.

The nose portion can be moved so as to close or open the gap either at the same time as the nozzle is moved or subsequently.

By having the walls of the gap shaped to direct the air into the compressor intake it is possible, in the case of a tiltable engine to take advantage of the ram air available as soon as the engine begins to tilt from its horizontal to its vertical position, i.e. at the beginning of the transition stage from horizontal flight to vertical.

The invention is illustrated, merely by way of example, in the accompanying drawings, in which:

FIGURE 4 shows the same engine with a jet deflector nozzle of the type disclosed in my co-pending application Serial No. 810,629, filed May 4, 1959.

FIGURE 5 shows the same engine swung through 45° so as to deflect the jet vertically downwardly, and FIGURE 6 illustrates diagrammatically means for moving the nose portion of the engine.

Figure 1:
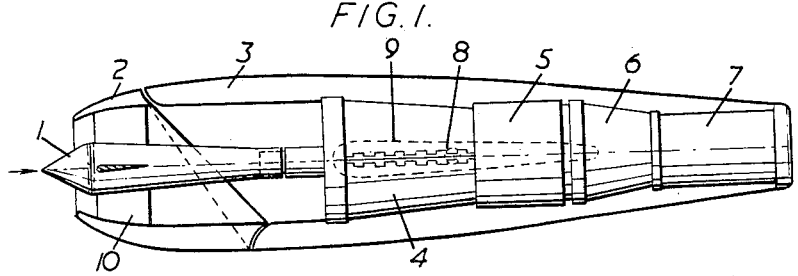
FIGURE 1 is a diagrammatic side elevation of a gas turbine engine in a nacelle rotatably supported on the end of a wing tip and embodying the present invention.

In FIGURE 1 is shown a gas turbine engine having a supersonic intake including a centre body 1 and a nose portion or fairing 2 forming part of a nacelle 3.

The engine which comprises a compressor 4, combustion equipment 5, turbine 6, and jet pipe 7, is pivoted at 8 on a wing 9 so that the whole engine and nacelle can be swung through 45° or 90° to provide vertical thrust.

Figure 2:
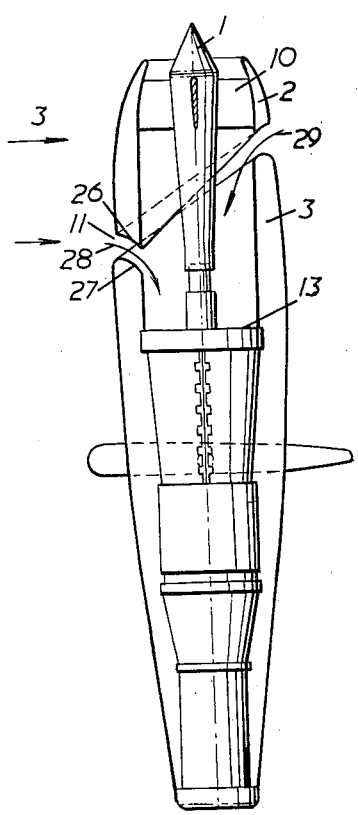
FIGURE 2 shows the same engine tilted through 90° for vertical take off.

The nose portion 2 is supported by inlet guide vanes 10 from the centre body 1 and the centre body 1 is axially movable from the position shown in FIGURE 1 to the position shown in FIGURE 2 in which a gap 11 is opened between the nose portion 2 and the remainder of the nacelle 3. The gap 11 is generally annular but is oblique to the axis of the engine at an angle of the order of 45 degrees.

In order to permit such axial movement, the centre body 1 has at its downstream end a tubular portion 12 which is mounted for axial sliding movement on a spigot 13 which is carried by the compressor intake 14. A piston 15 (FIGURE 6), working in an hydraulic cylinder 16, is provided for effecting movement of the centre body 1 by way of a piston rod 17 and link 18.

The opposite ends of the cylinder 16 are connected by pipes 19, 20 to a two-position valve 21, the latter being connected by pipes 22, 23 to outlet and inlet points respectively on a tank 24 or other source of hydraulic liquid.

When the two-position valve 21 is set by means of a control lever 25 to the position shown in FIGURE 6, the piston 15 is urged to the position in which the centre body 1 is moved outwardly and hence the gap 11 is opened. Setting of the valve 21 in the other position effects closure of the gap 11.

The walls 26 and 27 of the gap are shaped so as to direct ram air in the direction of the arrows 28 and 29 (FIGURE 2).

It is clear that when the annular gap 11 is opened up, ram air resulting from forward flight of the aircraft will be entrained into the gap and deflected into the compressor intake 14.

In use, as the engine and nacelle are tilted from the position shown in FIGURE 1 to the position shown in FIGURE 2 during the transition from horizontal flight to vertical flight or hovering, the gap 11 is opened up thus entraining ram air which assists in maintaining the supply of air to the compressor of the engine during this transition period.

Figure 3:
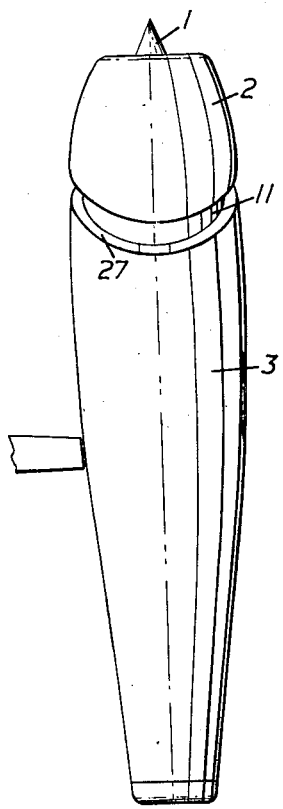
FIGURE 3 is an elevation of the engine in the direction of the arrow 3 shown in FIGURE 2.

In the arrangement shown in FIGURE 4 the forward portion of the engine is exactly the same as shown in FIGURES 1 to 3. The rear portion of the engine comprises a variable nozzle which is provided with a fixed tubular portion 30 which communicates in succession with two movable tubular portions 31, 32. The movable portions 31, 32 are mounted for angular movements relative to the longitudinal axis of the fixed portion 30 whilst the movable portion 32 is also mounted for angular movements relative to the longitudinal axis of the movable portion 31. The portions 31, 32 are interconnected by gearing 33 in the manner described in my co-pending application Serial No. 810,629. The gearing 33 forms part of nozzle adjustment means 34 which is adapted to effect angular movement of the portion 31 in a desired angular direction relative to the longitudinal axis of the fixed portion 30 and to effect equal angular movement of the portion 32 in the same angular direction relative to the longitudinal axis of the portion 31.

The arrangement is such that relative movement between the nozzle portions 31, 32 through 22½° is accompanied by relative movement between the portion 31 and the fixed portion 30 of a further 22½° so that the outlet portion of the nozzle is pointing vertically downwards (as shown in FIGURE 5) when the nacelle 3 and engine are tilted through 45°. Thus the engine can be tilted through only 45° and yet still give vertical thrust whilst the annular gap 11 enables ram air to be entrained during the transition period.

The annular intake described is applicable to any engine design to give vertical thrust for vertical flight, hovering, or vertical take off.

The annular gap can be formed in the nacelle or in the engine casing itself if there is no nacelle.

I claim:

1. A gas turbine engine comprising a compressor and air intake means therefor open at the front end of the engine axis, said air intake means comprising spaced apart wall members which are disposed downstream of the nose of the engine and define between themselves a gap, the wall members being shaped to direct air through said gap and into the air intake means aft of said front end, means effecting relative axial movement of said wall members so as to close or open said gap and means mounting said engine for selective positioning at and between a forward propulsion position and a vertical lift position, the gap being inclined at an angle to the said axis of the engine and the mounting means having such an axis that the forward edge of the gap is lower than the rearward edge thereof when the engine is vertical.

2. A gas turbine engine comprising a compressor and air intake means therefor open at the front end of the engine axis, said air intake means comprising relatively movable wall members which are disposed downstream of the nose of the engine and which are adapted to be spaced apart axially to provide between themselves an annular gap, the wall members being shaped to direct air through said annular gap and into the air intake means on movement of the engine relative to the air with a component lateral of the engine axis, means for effecting relative movement of said wall members so as to close or open said gap, and pivot means mounting said engine for selective positioning at and between a forward propulsion position and a vertical lift position, the gap being inclined at an angle to the axis of the engine and the axis of the pivot means being so arranged that the forward edge of the gap is lower than the rearward edge thereof when the engine is vertical.

3. A gas turbine engine adapted to produce vertical thrust comprising a compressor and forward air intake means therefor having a longitudinal axis, said air intake means comprising an open front nose portion relatively movable axially with respect to the remaining portion thereof into and out of a position in which it defines therewith an annular gap, means effecting relative movement of said nose portion and remaining portion so as to close or open said annular gap, means carried by said nose and remaining portions for directing air through said annular gap and into the remaining portion of the air intake means when the engine movement has a lateral component, and pivot means mounting said engine for selective positioning at and between a forward propulsion position and a vertical lift position, the gap being inclined at an angle to the said longitudinal axis and the axis of the pivot means being so disposed that the forward edge of the gap is lower than the rearward edge thereof when the engine is vertical.

4. A gas turbine engine adapted to produce vertical thrust comprising a compressor and forward tubular air intake means therefor having a longitudinal axis, said air intake means comprising relatively axially movable wall members disposed downstream of the air intake nose of the engine and adapted to be spaced apart to provide between themselves a gap, the wall members adjacent the gap being shaped to direct air through said gap and into the air intake means on movement of the engine with a lateral component, piston and cylinder means for effecting relative movement of said wall members so as to close or open said gap, and pivot means mounting said engine for selective positioning at and between a forward propulsion position and a vertical lift position, the gap being inclined to the said longitudinal axis and the axis of the pivot means being so disposed that the forward edge of the gap is lower than the rearward edge when the engine is vertical.

5. A gas turbine engine adapted to produce vertical thrust comprising a compressor and forward tubular air intake means therefor, said air intake means comprising axially spaced apart wall members disposed downstream of the air intake nose of the engine and defining between themselves a gap, the wall members being shaped to direct air through said gap and into the air intake means on movement of the engine having a lateral component, means for effecting relative axial movement of said wall members so as to close or open said gap, pivot means mounting said engine for selective positioning at or between a forward propulsion position and a vertical lift position, said engine including a variable jet nozzle comprising a fixed tubular portion and a first and a second movable tubular nozzle portion with which said fixed portion communicates sequentially, means mounting the movable portions for angular non-rotational movements relative to the longitudinal axis of the fixed portion, and means mounting one of the movable portions for angular non-rotational movements relative to the longitudinal axis of the other movable portion of the nozzle.

6. A gas turbine engine adapted to produce vertical thrust comprising a compressor and tubular air intake means therefor, said air intake means comprising relatively axially movable wall members disposed downstream of the nose of the said intake and adapted to be spaced apart to provide between themselves an annular gap, the wall members being shaped to direct air through said annular gap and into the after portion of the air intake means on lateral movement of the engine, means for effecting relative movement of said wall members so as to close or open said gap, pivot means mounting said engine for selective positioning at or between a forward propulsion position and a vertical lift position, said engine including a variable jet nozzle comprising a fixed tubular portion and a first and a second movable tubular nozzle portion with which said fixed portion communicates sequentially, means effecting angular nonrotational movement of the first movable portion in a desired angular direction relative to the longitudinal axis of the fixed portion, and means effecting equal angular non-rotational movement of the second movable portion in the same angular direction relative to the longitudinal axis of the first movable portion.

7. A gas turbine engine comprising a compressor, a tubular air intake means axially forward of the compressor and open at the forward end, said intake means being formed in two parts separated along a surface generally inclined at an angle of the order of 45° to the intake axis, means effecting relative movement of said parts axially to form or close a gap therebetween and means mounting said engine for selective positioning at or between a forward propulsion position when air enters the forward end of the intake and a lift position inclined toward the vertical when air may enter the gap on motion of the engine with a component lateral to its axis.

References Cited in the file of this patent

UNITED STATES PATENTS

| | | |
|---|---|---|
| 2,604,278 | Johnson | July 22, 1952 |

FOREIGN PATENTS

| | | |
|---|---|---|
| 717,760 | Great Britain | Nov. 3, 1934 |
| 1,112,986 | France | Nov. 23, 1955 |
| 743,874 | Great Britain | Jan. 25, 1956 |

OTHER REFERENCES

Flight Magazine, pages 155–156, Feb. 1, 1957, "V. T. O. L. Powerplants."